United States Patent [19]
Nojiri et al.

[11] Patent Number: 5,433,814
[45] Date of Patent: * Jul. 18, 1995

[54] GREEN TIRE BUILDING APPARATUS

[75] Inventors: Yasushi Nojiri, 8-146, Nakazatocho 1-chome, Kita-ku, Kobe-shi, Hyogo-ken 651-11; Yoshiomi Watanabe, 8-11-9, Mikagehonmachi, Higashinada-ku, Kobe-shi, Hyogo-ken, 658, both of Japan

[73] Assignees: Yasushi Nojiri; Yoshiomi Watanabe, both of Hyogo, Japan

[ * ] Notice: The portion of the term of this patent subsequent to Oct. 19, 2011 has been disclaimed.

[21] Appl. No.: 164,765

[22] Filed: Dec. 10, 1993

Related U.S. Application Data

[63] Continuation of Ser. No. 863,295, filed as PCT/TP90/01406, Nov. 1, 1990, abandoned.

[51] Int. Cl.⁶ .............................................. B29D 30/26
[52] U.S. Cl. ................................. 156/401; 156/415
[58] Field of Search ............... 156/398, 400, 401, 403, 156/414, 415, 417, 131, 132, 135

[56] References Cited

U.S. PATENT DOCUMENTS

| | | | |
|---|---|---|---|
| 3,188,260 | 6/1965 | Nebout | 156/401 |
| 3,698,987 | 10/1972 | Woodhall et al. | 156/401 |
| 3,784,426 | 1/1974 | Woodhall | |
| 3,816,218 | 6/1974 | Felten | |
| 3,929,540 | 12/1975 | Held et al. | 156/132 X |
| 4,081,310 | 3/1978 | Shickman et al. | 156/398 |
| 4,087,306 | 5/1978 | Head et al. | 156/132 |
| 4,087,307 | 5/1978 | Head et al. | 156/401 |
| 4,131,500 | 12/1978 | Wilde et al. | 156/415 |
| 4,239,579 | 12/1980 | Felten et al. | 156/398 |
| 5,141,588 | 8/1992 | Vanbuskirk | 156/401 |
| 5,225,028 | 7/1993 | Bierens | 156/401 |

FOREIGN PATENT DOCUMENTS

| | | |
|---|---|---|
| 71840 | 2/1983 | European Pat. Off. ......... 156/403 |
| 2149502 | 3/1973 | France . |
| 2372693 | 6/1978 | France . |
| 114554 | 9/1980 | Japan . |
| 78964 | 6/1981 | Japan . |
| 1237127 | 9/1989 | Japan . |

*Primary Examiner*—Geoffrey L. Knable

[57] ABSTRACT

A green tire building apparatus includes a plurality of bead locking segments arranged in a circle concentric with the main body of the shaping drum of the apparatus. A resilient annular member is mounted in an annular groove in the outer periphery of the bead locking segments, and the bead locking segments and annular member are moved radially outward for pushing a layer of tire material on the shaping drum against a bead which is disposed thereon. The movement is accomplished by a piston/cylinder and link mechanism. A turn-up bladder is arranged over, but separate from, the resilient annular member.

6 Claims, 3 Drawing Sheets

GREEN TIRE BUILDING APPARATUS

This application is a continuation of application Ser. No. 07/863,295 filed as PCT/TP90/01406, Nov. 1, 1990, now abandoned.

BACKGROUND OF THE INVENTION

The present invention relates to a green tire building apparatus for use in a tire production process.

As an apparatus for building a green tire, there has been conventionally known, for example, a single-stage building apparatus as shown in FIG. 4. The apparatus shown in FIG. 4 is symmetrical with respect to a vertical center line of a shaping drum, and therefore only a left half of the apparatus is shown in the figure for the sake of simplicity. In FIG. 4, indicated at 1 is a rubber former, and at 2 a turned-up bladder. When the bladder 2 is not inflated and a bead locking mechanism is not actuated, an outer surface of the bladder 2 is in the form of a cylinder having substantially the same radius as a cylinder formed by an outer surface of the rubber former 1.

An end of the rubber former 1 is fixedly held by clamp rings 3, 3'. An inner end 12 of the bladder 2 and an outer end thereof are fixed respectively neighboring the end of the rubber former 1. A rubber solid band 4' is integrally formed with the outer end of the bladder 2. Another rubber solid band 4 is also formed integrally with the bladder 2 near the inner end thereof. Both rubber solid bands 4, 4' are fitted in respective recessed portions 6 formed in outer surfaces of a plurality of metal segments 5 arranged in a circumferential direction of the shaping drum. The metal segments 5 collectively form an annular body. An annular rubber bag 7 is provided inside the metal segments in contact with an inner surface of the annular body formed by the metal segments 5, Indicated at 8 is a support for the bladder 2.

In this apparatus, a carcass 9 is formed by winding tire components such as a ply and a chafer onto the rubber former 1. A bead 10 provided with or without an apex is set in a specified position on the carcass 9. In this state, when the rubber bag 7 is inflated with the air supplied to the inside thereof, a state shown in FIG. 4 can be obtained. More specifically, the rubber bag 7 pushes the metal segments 5 outward, i.e., in a direction of an arrow A in FIG. 4, expanding radii of the rubber solid bands 4, 4'. In addition, a portion 9a of the carcass 9 in contact with the bead 10 is pushed up against an inner circumferential surface of the bead 10 by the inflated rubber bag 7, and thereby the bead 10 is locked in the portion 9a. This mechanism is referred to as a bead locking mechanism hereinafter.

In the above state, the bladder 2 is inflated with the air supplied to the inside thereof, and a side portion 9b of the carcass 9 is turned up around the bead 10 by the inflated bladder 2. This mechanism is referred to as a carcass turn-up mechanism hereinafter. Further, the clamp rings 3, 3', the bead locking mechanism, and the carcass turn-up mechanism are moved by a predetermined distance in an axial direction of the shaping drum to a right half of the apparatus, i.e., in a direction of an arrow B while inflating the rubber former 1. Thereby, the carcass 9 is shaped in the form of a toroid. A green tire can be completely built by applying a breaker and a tread assembly to the toroidal carcass.

However, in the above apparatus, the metal segments 5 are moved outward by the inflation of the rubber bag 7, therefore there is a limit in the pressure generated in the rubber bag 7. Accordingly, the carcass portion 9a locks the bead 10 in contact therewith with insufficient restraint. With the bead 10 locked with the insufficient restraint by the carcass portion 9a, when pulled during a tire shaping operation on the rubber former 1, the carcass portion 9a is liable to dislocate relative to the bead 10 in the axial direction of the shaping drum. Consequently, cord paths become out of place, causing uniformity of the tire to degrade.

Further, the rubber bag 7 liable to deform is used in this apparatus. Accordingly, a center of the bead 10 is liable to dislocate from that of the shaping drum, resulting in eccentricity. This is also a large factor contributing to degradation of the uniformity.

Moreover, in the above apparatus, the rubber solid bands 4, 4' are integrally formed with the bladder 2. Accordingly, it is difficult to fabricate the bladder 2 and to assemble the bladder 2 into the apparatus. Furthermore, in the case where the bladder 2 is punctured, the rubber bands have to be replaced with new ones together with the bladder, wasting the still usable rubber bands.

DISCLOSURE OF THE INVENTION

In order to solve the foregoing drawbacks, the present invention is constructed as follows.

A green tire building apparatus of the present invention is provided with a shaping drum including a main body having opposite sides, the green tire building apparatus comprising, on each of the opposite sides of the shaping drum main body, a bead set in a specified position on the shaping drum main body, a plurality of bead locking segments arranged in a circumferential direction of the shaping drum in a position corresponding to the bead setting position, and supported movably in radial directions of the shaping drum, a turn-up bladder extending through outside outer surfaces of the respective bead locking segments to a position outward of an end of the shaping drum main body in an axial direction of the shaping drum, a resilient annular member disposed around the outer surfaces of the bead locking segments, a movable member movable along the axial direction of the shaping drum, driving means for moving the movable member, a movement conversion mechanism for converting the movement of the movable member to the movements of the respective bead locking segments in the radial directions of the shaping drum.

With the above construction, a carcass is formed by winding tire components around the shaping drum with opposite ends thereof placed on the respective turn-up bladders. Subsequently, the bead is set in a specified position on the carcass where the bead is to be locked. The drive means then moves the movable member in a predetermined axial direction of the shaping drum so as to move all the bead locking segments radially outward. Thereby, the resilient annular member pushes the carcass up against an inner circumferential surface of the bead. In this state, the respective bead locking segments push the carcass up against the inner circumferential surface of the bead upon the strong driving force from the driving means. Accordingly, the bead does not slip out of its locked position on the carcass during a tire shaping operation.

Further, a green tire building apparatus of the present invention is provided with a shaping drum including a main body having opposite sides, the green tire building apparatus comprising, on each of the opposite sides of the shaping drum main body, a bead set in a specified position on the shaping drum main body, a plurality of bead locking segments having on outer surfaces thereof recessed portions, arranged in a circumferential direction of the shaping drum in such a manner that the recessed portions of the respective segments are connected to one another to collectively form an annular groove, and supported movably in radial directions of the shaping drum, a resilient annular member accommodated in the annular groove formed by the bead locking segments, a turn-up bladder formed independently of the resilient annular member and extending beyond an outer surface of the resilient annular member to a position outward of an end of the shaping drum main body in an axial direction of the shaping drum.

With the above construction, the resilient annular member and the turn-up bladder are formed independently of each other. Accordingly, a replacement operation of, for example, the turn-up bladder can be effected independently of the resilient annular member.

DETAILED DESCRIPTION OF THE PREFERRED EMBODIMENTS

Figure 1:
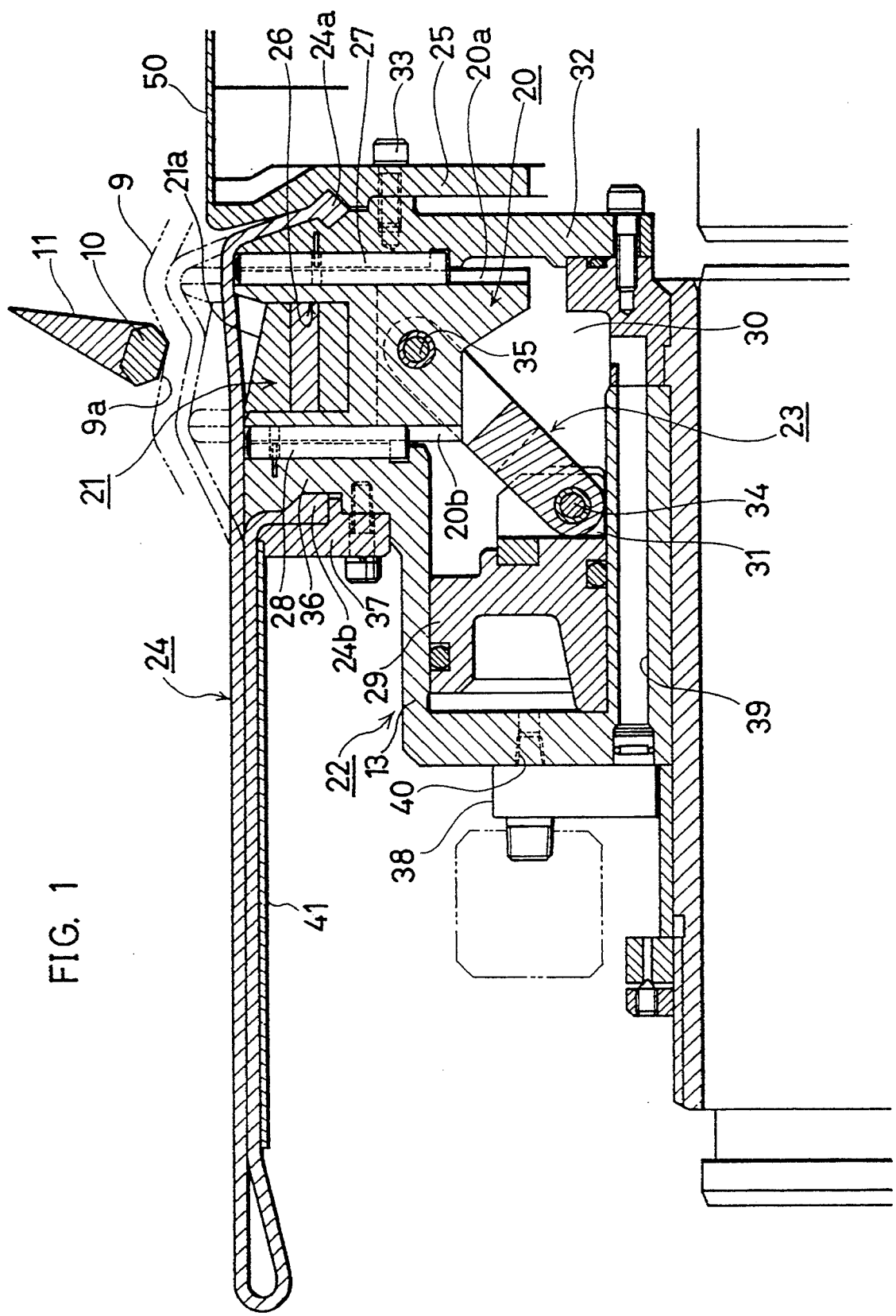
FIG. 1 is a plan view in section showing a main portion of a green tire building apparatus embodying the present invention.

An embodiment of the present invention will be described with reference to FIGS. 1 to 3.

In these figures, indicated at 25 is a main body of a shaping drum. In this embodiment, the shaping drum is not provided with a bladder. A green tire building apparatus in this embodiment is symmetrical with respect to vertical center line of the shaping drum, and therefore only a left half portion of the apparatus is shown in FIG. 1 for the sake of simplicity. A driving portion (driving means) 22 is attached to a side wall of the shaping drum main body 25. The driving portion 22 comprises an inner side wall 32 and an outer side wall 36. The inner side wall 32 is secured to the side wall of the shaping drum main body 25 by a bolt 33. The outer side wall 36 has an annular cylinder portion 13 formed in a center portion thereof.

Between the side walls 32 and 36 is defined a space 30. In the space 30, a plurality of bead locking segments 20 are juxtaposedly arranged in a circumferential direction of the drum main body 25 so as to form a ring. As a mounting structure of the bead locking segments, guide rods 27, 28 are respectively secured to opposing faces of the side walls 32 and 36, with guide rods 27, 28 extending in a radial direction of the shaping drum. In addition, grooves 20a, and 20b are formed respectively in inner and outer side portions of each bead locking segment 20. The guide rods 27, 28 as shown in FIG. 3 are respectively fitted in the grooves 20a, 20b. Accordingly, each bead locking segment 20 is supported movably along the guide rods 27, 28.

An annular piston (moving member) 29 is provided in the cylinder portion 13. On the outer face of the cylinder portion 13 is provided a piping block 38. Air is supplied to the space 30 where the bead locking segments 20 are accommodated through the piping block 38 and a passage 39. Air is also supplied rearward of the piston 29 through the piping block 38 and an opening 40 for supplying and discharging the air to and from the cylinder portion 13, whereby the piston 29 is actuated.

Figure 2:
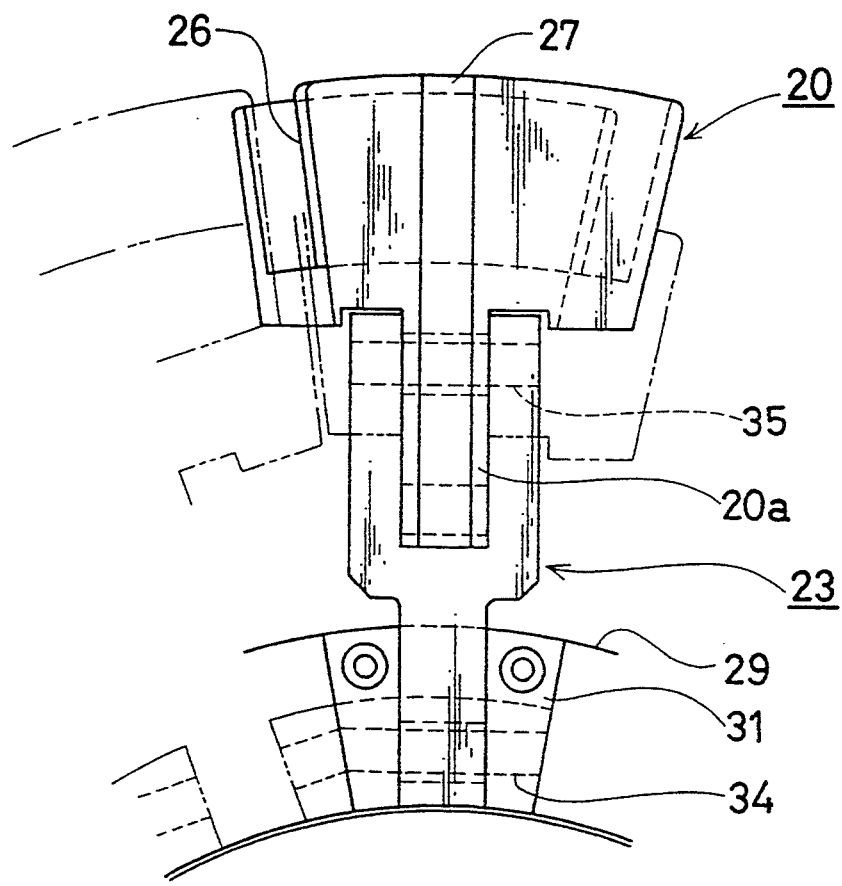
FIG. 2 is a side elevation view showing the main portion of the green tire building apparatus.
Figure 3:
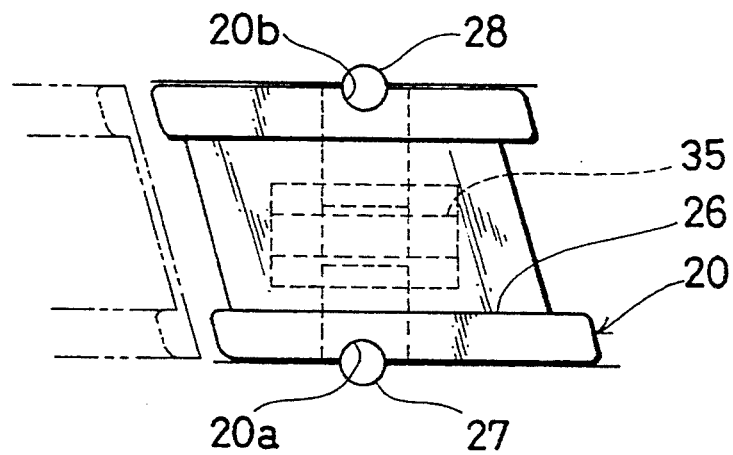
FIG. 3 is a plan view showing the main portion of the green tire building apparatus.
Figure 4:
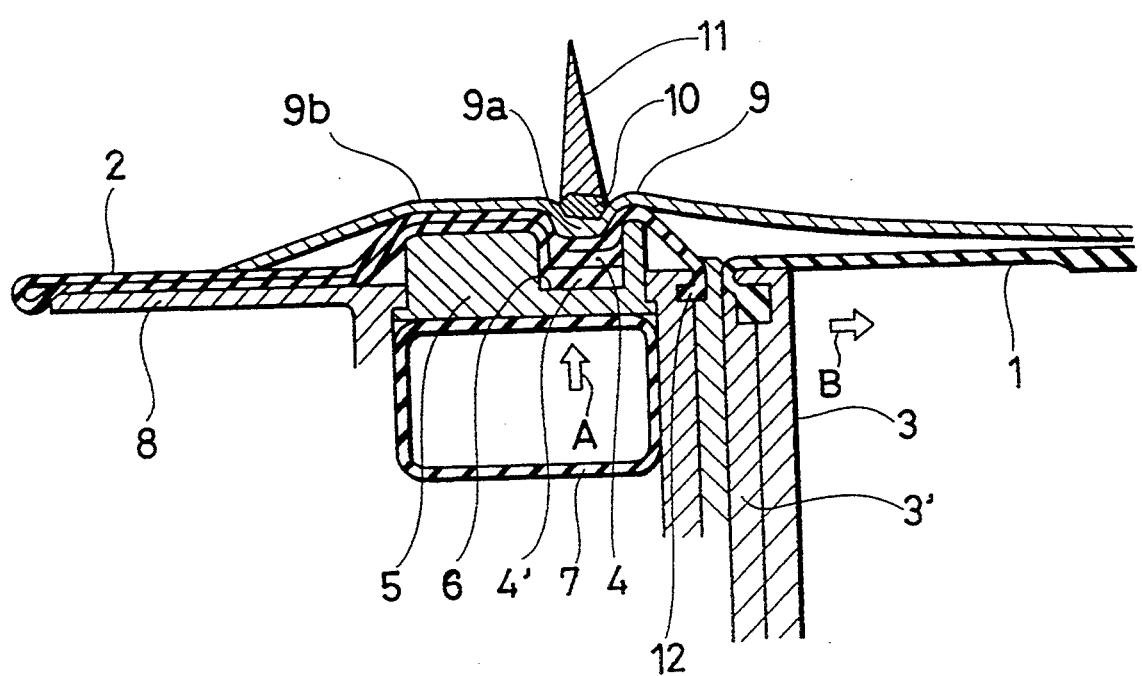
FIG. 4 is a plan view in section showing a main portion of a prior art green tire building apparatus.

In an inner end portion of the piston 29 with respect to the axial direction of the shaping drum are formed link mounting portions 31 including two brackets as shown in FIG. 2. The number of link mounting portions 31 corresponds to the number of bead locking segments 20. One end of a drive link 23 is mounted pivotally through a pin 34 between the brackets of each link mounting portion 31. The other end of each drive link 23 is shaped in the form of a fork, and pivotally mounted through a pin 35 to an inner end portion of each bead locking segment 20 with respect to the radial direction, i.e., a lower end portion thereof in FIG. 1. More specifically, the piston 29 and the respective bead locking segments 20 are respectively coupled through the drive links 23, constituting a link mechanism. By this link mechanism, the movement of the piston 29 in the axial direction of the drum is converted to the movement of the respective bead locking segments 20 in radial directions thereof.

In the outer surface of the respective bead locking segment 20 are formed grooves 26 opening outward in the radial direction. In FIG. 1, the groove 26 is open upward. The bead locking segments are so arranged that the grooves 26 thereof can collectively form an annular groove. A plurality of solid rubber rings (in this embodiment, three rings) are fitted in the annular groove with one rubber ring lying over another. These solid rubber bands constitute an annular rubber band (resilient annular member) 21. In this embodiment, an outer surface 21a of the rubber band 21 is substantially flat and inclined. An inclination angle of the outer surface 21a may be set at a specified value depending upon a mounting state of a bead 10 relative to a tire. In some cases, the outer surface 21a may not need to be inclined.

Further, a turned-up bladder 24 formed independently of the rubber band 21 is so provided axially outward of the shaping drum main body 25 (the left-hand side in FIG. 1) as to cover completely the driving portion 22 (the upper side in FIG. 1.) An inner end 24a of the turned-up bladder 24 is fixedly held between the inner side wall 32 and the side wall of the shaping drum main body 25. The bladder 24 extends from the inner end 24a thereof through outer surfaces of the bead locking segments 20 and the rubber band 21 to a position axially outward of an end of the shaping drum, shaping into a cylindrical form. The bladder 24 is then turned up in the middle, and an outer end 24b thereof is fixedly held between the outer side wall 36 and another annular member 37.

The air is supplied and discharged to and from the turn-up bladder 24 by way of the passage 39 connected to the outside through the piping block 38, the space 30, and a space defined by the outer side wall 36, the bead locking segments 20, and the inner side wall 32. In FIG. 1, the opening 40 is another means for supplying and discharging the air to and from the cylinder portion 13. Indicated at 41 is a support for the bladder, and at 50 a drum portion of the shaping drum.

Next, there will be described a green tire building process with the use of the above apparatus.

Firstly, the carcass 9 is formed by winding tire components around the apparatus. Then, the bead 10 having an apex 11 is set in a position corresponding to a disposing position of the bead locking segments 20. It should be noted that the bead 10 may not be provided with an apex 11. In this state, the compressed air is supplied to the cylinder portion 13 of the driving portion 22 through the opening 40, whereby the piston 29 is moved to the right in FIG. 1. This movement of the piston 29 is converted to a radially outward movement of the respective bead locking segments 20 by a movement conversion mechanism constituted by the respective drive links 23. More specifically, each drive links 23 is displaced from an inclined state thereof to an upright state thereof, pushing the corresponding bead locking segment 20 radially outward. As a consequence, a radius of the rubber band 21 is expanded. The radially expanded rubber band 21 pushes a portion 9a of the carcass 9 on which the bead 10 is wound up against the inner circumferential surface of the bead 10 as shown with phantom lines in FIG. 1. This causes the bead 10 to be brought in a locked state thereof.

With the bead 10 in the locked state, air is supplied to the space 30, and thereby the turn-up bladder 24 is inflated so as to turn up an end portion of the carcass 9 around the bead 10. Further, air is supplied to the shaping drum main body 25 so as to shape the carcass 9 in the form of a toroid. A green tire can be completely built by applying a breaker and tread assembly to the toroidal carcass. At this stage, the bead 10 is locked in the carcass 9 with strong restraint by the work of the driving portion 22. Accordingly, there is very little likelihood that the bead 10 will be dislocated relative to the carcass portion 9a during a tire shaping operation.

Further, in the case where the turn-up bladder 24 requires replacement due to a puncture or other cause, only the turn-up bladder 24 is to be replaced, with the rubber band 21 left as it is.

It should be noted that the present invention is not limited in the foregoing embodiment, but can also be embodied as follows:

(1) In the foregoing embodiment, a rubber band (resilient annular member) 21 comprises a plurality of solid rubber rings, but may comprise a single resilient member. However, by having a multi-layer structure as shown in the foregoing embodiment, the rubber band 21 can be radially expanded at a relatively smaller pressure during a bead locking operation. Also, the reduction of the gauge pressure, which is caused due to the expansion, can be maintained at a relatively smaller amount.

(2) In the foregoing embodiment, an axial movement of a piston 29 is converted to a radial movement of respective bead locking segments 20 through a link mechanism. However, a specific construction of a movement conversion mechanism is not limited to the above embodiment. For example, the movement conversion mechanism may be constructed as follows. A cam portion tapered to a point is provided at an axially inner end of the piston 29 with respect to a center of a shaping drum. Each bead locking segment 20 is provided with a cam follower bearing in contact with the cam portion. The cam portion and the cam followers bearing in contact therewith serve as a movement conversion mechanism similar to the aforementioned link mechanism, thereby providing the same effect as above embodiment.

(3) In the foregoing embodiment, an apparatus is provided with a former not having a bladder, i.e., of the telescoping type. However, the present invention may well be applied to an apparatus provided with a former having a bladder.

As described above, the present invention is very useful as a green tire building apparatus. Respective bead locking segments can be driven strongly in a radial direction with the driving force of a single drive means by way of a movement conversion mechanism. Thereby, a bead can be locked accurately in a carcass portion with a strong restraint. Accordingly, dislocation of the carcass portion and the bead relative to each other during a tire shaping operation, and cord paths becoming out of place are prevented, resulting in an improved uniformity of a tire.

Further, according to the present invention, a turn-up bladder is formed independently of a resilient annular member, and provided outside the resilient annular member, which consequently makes it possible to fabricate the bladder more easily than a conventional one, and facilitates replacement operation of a punctured bladder.

What is claimed is:

1. A green tire building apparatus comprising:
a shaping drum including a main body having opposite sides for supporting a layer of tire material and a pair of beads, one of said beads being disposed on each of the opposite sides of said shaping drum concentrically of the shaping drum in radially outwardly spaced relation to the shaping drum;
on each of the opposite sides of the shaping drum main body,
a turn-up bladder having a first end and a second end;
a plurality of bead locking segments movable in radial directions of the shaping drum between an expansion state and a contraction state and arranged in a circle concentric with the shaping drum;
moving means for moving the plurality of bead locking segments in the radial directions;
a resilient annular member mounted on the outer periphery of the plurality of bead locking segments, formed independently of the turn-up bladder and adapted for pushing the turn-up bladder against the layer of tire material, causing the tire material to engage the inner periphery of the bead when the plurality of bead locking segments are in the expansion state, the resilient annular member having a substantially flat surface for engaging and pushing the turn-up bladder against the tire material thereby placing the tire material and bead in a locked condition; and
means for securing the first and second ends of the turn-up bladder on opposite sides of the outer periphery of the plurality of bead locking segments.

2. The green tire building apparatus as defined in claim 1, wherein said resilient annular member comprises a plurality of annular resilient members lying one over another in said radial direction of the shaping drum.

3. The green tire building apparatus as defined in claim 1, wherein the surface of said resilient annular member is inclined relative to said axial direction of the shaping drum.

4. The green tire building apparatus as defined in claim 7, wherein each of the plurality of bead locking segments has an annular groove for receiving the resilient annular member.

5. The green tire building apparatus as defined in claim 1, wherein the moving means comprises:
a movable member movable in axial directions of the shaping drum;

a driving member for moving the movable member in the axial directions; and a movement conversion mechanism for converting the axial movement of the movable member to the respective radial movements of each of the plurality of bead locking segments for moving the plurality of bead locking segments between the expansion state and the contraction state.

6. The green tire building apparatus as defined in claim 5, wherein:

the movable member includes a piston;

the driving member includes a cylinder for driving the piston; and the movement conversion mechanism includes a link mechanism for coupling the piston with the plurality of bead locking segments, and a guide member for guiding each of the plurality of bead locking segments in the radial directions.

* * * * *